(12) United States Patent
Alfarano et al.

(10) Patent No.: US 11,792,166 B2
(45) Date of Patent: Oct. 17, 2023

(54) METHOD FOR GENERATING PERSONALIZED PROFILE PACKAGE DATA FOR INTEGRATED CIRCUIT CARDS

(71) Applicant: STMicroelectronics S.r.l., Agrate Brianza (IT)

(72) Inventors: Marco Alfarano, Pozzuoli (IT); Sofia Massascusa, Caserta (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 959 days.

(21) Appl. No.: 16/656,880

(22) Filed: Oct. 18, 2019

(65) Prior Publication Data
US 2020/0137030 A1    Apr. 30, 2020

(30) Foreign Application Priority Data
Oct. 30, 2018   (IT) .................. 102018000009905

(51) Int. Cl.
*H04L 9/40* (2022.01)
*G06F 16/9035* (2019.01)
*H04L 9/08* (2006.01)

(52) U.S. Cl.
CPC ...... *H04L 63/0428* (2013.01); *G06F 16/9035* (2019.01); *H04L 9/0816* (2013.01)

(58) Field of Classification Search
CPC ............... H04L 63/0428; H04L 9/0816; G06F 16/9035; G06F 21/35; H04W 4/60;
(Continued)

(56) References Cited

U.S. PATENT DOCUMENTS

2007/0033417 A1* 2/2007 Gammel ............. H03M 13/116
                                                            713/189
2007/0083759 A1* 4/2007 Drew ................... H04L 9/0894
                                                            713/168
(Continued)

OTHER PUBLICATIONS

Simalliance, "eUICC Profile Package: Interoperable Format Technical Specification", Version 2.2, Sep. 2018, 105 pages.
(Continued)

*Primary Examiner* — Michael R Vaughan
*Assistant Examiner* — Abdullah Almamun
(74) *Attorney, Agent, or Firm* — Slater Matsil, LLP

(57) ABSTRACT

A method can be used for generating personalized profile package data for integrated circuit cards. The method includes encrypting data records corresponding to profile data with a respective data protection key thereby obtaining encrypted data records. Each record includes a number of personalization fields to store different types of personalization values. The method also includes encrypting a file for a profile package with a master encryption key thereby obtaining an encrypted file for the profile package. The file includes fields to be personalized corresponding to one or more of the personalization fields to store different types of personalization values. The encrypted file for the profile package and encrypted data records are transmitted to a data preparation entity where the encrypted data records and the encrypted file can be decrypted and combined to obtain personalized profile packages.

20 Claims, 4 Drawing Sheets

(58) Field of Classification Search
CPC ....... H04W 4/50; H04W 12/42; H04W 12/35; H04W 8/20; H04W 8/265
See application file for complete search history.

(56) References Cited

U.S. PATENT DOCUMENTS

| | | | | |
|---|---|---|---|---|
| 2007/0250904 | A1* | 10/2007 | Waller | H04L 63/0435 726/1 |
| 2012/0297191 | A1* | 11/2012 | Johnson | H04L 63/123 713/168 |
| 2013/0117556 | A1* | 5/2013 | Coleman | H04L 63/0492 713/153 |
| 2014/0219447 | A1* | 8/2014 | Park | H04W 12/35 380/247 |
| 2014/0329502 | A1* | 11/2014 | Lee | H04W 12/04 455/411 |
| 2015/0163056 | A1* | 6/2015 | Nix | H04W 12/06 380/46 |
| 2015/0271173 | A1* | 9/2015 | Seo | H04W 12/08 726/9 |
| 2016/0142906 | A1 | 5/2016 | Park et al. | |
| 2016/0302070 | A1* | 10/2016 | Yang | H04W 12/42 |
| 2017/0061138 | A1* | 3/2017 | Lambert | H04L 63/18 |
| 2017/0142121 | A1* | 5/2017 | Lee | H04L 63/0853 |
| 2017/0155507 | A1* | 6/2017 | Park | H04W 8/18 |
| 2019/0097794 | A1* | 3/2019 | Nix | G06F 21/35 |
| 2019/0199524 | A1* | 6/2019 | Takemori | H04L 9/32 |
| 2020/0045544 | A1* | 2/2020 | Yu | H04W 12/35 |
| 2020/0137030 | A1* | 4/2020 | Alfarano | H04W 4/50 |

OTHER PUBLICATIONS

GSM Association, "RSP Technical Specification", Version 2.2, Sep. 1, 2017, 264 pages.
GSM Association, "Embedded SIM Remote Provisioning Architecture", Version 1.1, Jan. 30, 2014, 85 pages.

* cited by examiner

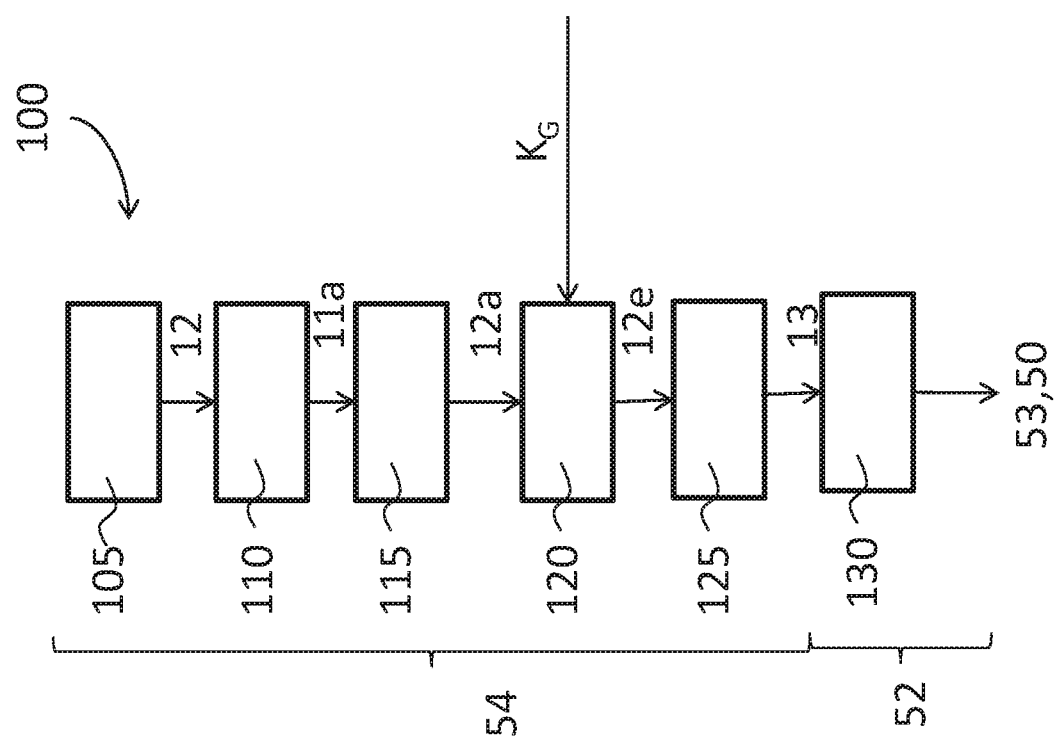

*Fig. 3*

```
value02 ProfileElement ::= mf : {
        mf-header {
                mandated NULL,
                identification 2
        },
        templateID {2 23 143 1 2 1},
        mf{
                fileDescriptor : {
                        lcsi '05'H,
                        pinStatusTemplateDO '01810A'H
                }
        },
        ef-iccid{
                fileDescriptor : {
                        lcsi '05'H,
                        shortEFID '10'H
                },
                fillFileContent : '98000000000000040F5'H    — F1
        },
        ef-dir{
                fileDescriptor : {
                        fileDescriptor '42210026'H,
                        lcsi '05'H,
                        efFileSize '98'H
                },
                fillFileContent :'61184F10A000000871002F
                310FFFF89080000FF50045553494D'H,         — F2
                fillFileOffset : 12,
                fillFileContent : '61184F10A000000871004F
                310FFFF89080000FF50044953494D'H,         — F3
                fillFileOffset : 12,
```

METHOD FOR GENERATING PERSONALIZED PROFILE PACKAGE DATA FOR INTEGRATED CIRCUIT CARDS

CROSS-REFERENCE TO RELATED APPLICATIONS

This application claims priority to Italian Patent Application No. 102018000009905, filed on Oct. 30, 2018, which application is hereby incorporated herein by reference.

TECHNICAL FIELD

Embodiments relate to a method for the generation of personalized profile package data for integrated circuit cards.

BACKGROUND

The solution refers to optimized and reliable generation of personalized profile package batches at a Profile Maker side which can be used in devices such as integrated cards, in particular embedded UICC.

It is known that the eUiCC (embedded UICC) market environment comprises the generation of personalized profile package data.

A Profile is a combination of a file structure, data and applications which are stored in an eUICC. A Profile Package is a Personalized Profile coded as an interoperable description format which is transmitted to an eUICC in order to load and install a Profile.

For instance the consortium SIMalliance defines an interoperable format to represent a Profile Package in the document "eUICC Profile Package:Interoperable Format Technical Specification", available at the URL http://simalliance.org/wp-content/uploads/2015/03/Profile-interoperability-technical-specification_V1-0.pdf. Such interoperable format represents the structure of data to be built by the Profile Maker and to be loaded in the eUICC card in order for the eUICC to be personalized according to the content of the Profile Package. The Profile Maker is an external entity, i.e. communicates data via a communication channel to a SM-DP entity (Subscription Manager-Data Preparation), in charge of creating the Profile Package based on the MNO (Mobile Network Operator) requirements, protecting the Profile Package from modification and/or content access.

The entity, such as the Profile Maker entity, SM-DP entity or MNO entity, correspond to a subject performing operations, usually by means of one or more computer, involving handling and exchanging data, such entities being usually coupled for communication by communication network, e.g., the Internet, or communications channel.

A distinction may be traced among Profile Creator, Profile Maker and SM-DP. The Profile Creator may be the entity producing the master profile, the Profile Maker may be the entity generating profile data and using them to create personalized profiles, which are then bundled everything in one or more batches, while the SM-DP may receive the batches and store the profiles contained in them. These entities may be separated entities.

The Profile Package is defined in an ASCII text format, specifically ASN.1 (Abstract Syntax Notation One) and includes a set of fields to be personalized, i.e. in which are to be written values specific of a given card. A Profile Package can be used by systems (servers or eUicc cards) only after conversion into DER (Distinguished Encoding Rules) format, which is a hexadecimal format. Conversion from ASN.1 to DER format however is very time consuming.

In FIG. 1 it is shown a schematic representation of an example of a system for the personalization of IC cards in which the eUICC card operates. Such system includes a plurality of entities, which performs operation on the data, and can be implemented on computer, in particular, server, which are interconnected through a communications network, i.e. such entities are hosted in nodes of such network.

With the numeric reference 50 is indicated the eUICC card, which for instance resides in a mobile phone, which is not shown in FIG. 1. With 51 is indicated an entity corresponding to a Mobile Network (MNO) operator which can issue a Profile Ordering PO command to a Profile Maker 54 Such Profile Maker 54, i.e. is an entity configured to prepare personalized Profile Packages 12a for respective cards, such personalized Profile Packages 12a being thus s stored in the eUICC 50, for instance through an OTA (Over The Air) channel. The Profile Maker 54, as mentioned, is a profile making entity which provides personalization data in a data structure, in particular includes or makes available a personalization data table 11a better described in the following also with reference to FIG. 3.

In the embodiment of FIG. 1 the Profile Maker 54 receives a master profile 12 provided from a Profile Creator 53, which in this case is a separate entity, although in variant embodiments, these two entities 54, 53 can be integrated in a same profile making entity, i.e. a same server or node of the system described. The Profile Maker 54, which may reside on a server or a network node, may be then in communication with a Data Preparation 52 server or node which includes modules like an OTA RFM (Over The Air Remote File Management) engine and a Keys Manager. At the same time the MNO 51 sends the Profile Order PO, the MNO 51 also sends a Profile Enabling PE command to a Secure Routing server 53, which is configured to secure routing of profiles and sends a Profile Download enabling command PDE to the UICC card 50, thus enabling download and storing of the personalized Profile Package 12a in the eUICC card 50.

In FIG. 2 is shown a flow diagram representing a method for the generation of a personalization profile indicated with the reference 100. In FIG. 3 are shown schematically objects such as a personalization data table 11a and a personalized Profile Package 12a which are employed in the steps of such method. With 105 is indicated an operation of providing, at the Profile Maker 54, in particular from the Profile Creator 53, a master Profile 12, e.g. a profile file or template in which the Profile Package is stored. Such Profile Package is an ASCII text in ASN.1 format. This master Profile file 12 is written by a profile designer at the Profile Maker 54, which, on the basis of the eUICC interoperable format mentioned above, writes Profile Elements in ASN.1 language according to the necessities of the set of cards 50 to be personalized to which also the table 11a refers.

Thus, such ASCII Profile Package file 12 through such ASN.1 file is written to include a plurality of p fields to be personalized $F_1 \ldots F_k \ldots F_p$, k being the index of the generic field $F_k$, which are in correspondence with a subset or all of the personalization fields T1 . . . Tm in the personalization table 11a and in which the personalization values in the corresponding personalization fields T1 . . . Tm can be written. These fields to be personalized $F_1 \ldots F_k \ldots F_p$ the Profile Package file 12 accept hexadecimal values and usually are initialized (prior the substitution operation 115 described in the following) with an initialization value, e.g. a default hexadecimal value.

The method 100 then includes an operation 110 of providing a personalization data table 11a. In the example described such personalization data table 11a is a simple table data structure organized in rows and columns. Such data table 11a includes a plurality of records $R_1 \ldots R_n$, corresponding to the rows of the table 11a. Each i-th record $R_i$ corresponds to a determined i-th integrated circuit card 50 in a set comprising a number n of cards 50 to be personalized with a respective personalized Profile Package 12a. In a personalization procedure, for instance the number n of cards 50, and thus the number n of records R1 . . . Rn can amount to one million.

Each column of the personalization data table 11a include then a personalization field $T_1 \ldots T_m$, m being the number of fields in the table 11a, in which a different type of personalization value is stored. In some fields among the personalization fields T1 . . . Tm can be stored the Crypto Keys, in other fields the PIN numbers, the Unique Id and other personalization data. A given profile data to be sent to a card 50 corresponds to a personalization record $R_i$, the personalization values of that specific given card 50 are stored in these fields. The generic personalization field is indicated by $T_j$, j being the index of the personalization fields going from 1 to m.

Then in a step 115 the Profile Package 12a is obtained substituting the desired personalization data from table 11a in the master Profile file 12.

Here below in Table 1 is supplied an example of a portion of such Profile Package in the Profile Package file 12, which is also shown in FIG. 2.

TABLE 1

```
value02 ProfileElement ::= mf: {
    mf-header {
        mandated NULL,
        identification 2
    },
    templateID {2 23 143 1 2 1},
    mf{
        fileDescriptor : {
            lcsi '05'H,
            pinStatusTemplateDO '01810A'H
        }
    },
    ef-iccid{
        fileDescriptor : {
            lcsi '05'H,
            shortEFID '10'H
        },
        fillFileContent : '980000000000000040F5'H
    },
    ef-dir{
        fileDescriptor : {
            fileDescriptor '42210026'H,
            lcsi '05'H,
            efFileSize '98'H
        },
        fillFileContent :
'61184F10A0000000871002F31oFFFF89080000FF50045553494D'H,
        fillFileOffset : 12,
        fillFileContent :
'61184F10A0000000871004F310FFFF89080000FF50044953494D'H,
        fillFileOffset : 12,
```

As shown for instance the Elementary File ef-iccid dedicated to the ICCID (Integrated Circuit Card ID) value includes an instruction fillFileContent(argument) which argument represents a customizable fixed-length field, i.e. a field to be personalized, which in FIG. 2 is indicate with F1, corresponding to the personalization field for the ICCID value in the data table 11a. In the example the field to be personalized for the ICCID is set to the initial value 980000000000000040F5'H, the H indicating a hexadecimal value. The Elementary file Ef-dir includes two other customizable fields F2, F3 also in correspondence of the instruction fillFileContent. In these cases an offset value is added after the instruction fillFileContent to allow writing the value in a file at a specified offset position. Thus it is important to observe that the ASCII master Profile file 12 allows writing the personalization values in files and allows writing in such files at given offset positions. These methods and procedures are known per se and are detailed for instance in the already mentioned SIMalliance reference document "eUICC Profile Package:Interoperable Format Technical Specification", which in particular at page 19 FIG. 2 details the processing of the 'File' type just summarized.

Thus, then in an operation 115 the master Profile 12 file is personalized in order to obtain a set of personalized Profile Packages 12a file substituting in the fields to be personalized $F_1 \ldots F_k \ldots F_p$ the value in the corresponding personalization fields T1 . . . Tp, as mentioned a subset or all of the personalization fields T1 . . . Tm in the data table 11a, of a record $R_i$ corresponding to the specific card 50 in which the personalized Profile Package 12a must be stored.

Thus, a personalized Profile Package file 12a is obtained by the substitution operation 115.

Subsequently, since only Profile Packages expressed in hexadecimal code can be used and executed by the eUICC card 50, the personalized Profile file 12a is converted in a hexadecimal Profile Package file, by a DER conversion operation, not shown in the figure, formed by sequences of hexadecimal codes.

Then in a step 120 the personalized Profile Package 12a is protected by an encryption using an encryption key $K_G$. All the personalized profiles 12a are protected (encrypted), each one with its own respective encryption key $K_G$, obtaining personalized protected files 12e.

Subsequently in a step 125 the protected personalized files 12e are put together in a respective batch according to the specific SM-DP(+) OTA platform specifications of the Data Preparation 52 to which are to be sent. Such batch of protected personalized files 12e results in a single output file 13, which is then sent to the Data Preparation entity 52. The Data Preparation 52 in an operation 130 sends the output file 13 to the cards 50 as shown in FIG. 1, in particular through the Secure Routing server 53.

This method to provide generation of personalized profile package data determines that the output file's size from the Profile Maker to the Data Preparation are very big. Further, since profiles have been already personalized, there cannot be an additional check regarding the link between a specific product (master profile) and the personal data with an aim to traceability.

More in particular, regarding the problem of the size of the output file, even if personalized profiles have in common 95-98% of data, the profile protection with diversified encryption keys make the protected profiles completely different one with respect to the other: compression algorithms are therefore not effective.

Regarding the problem of the traceability, then, it cannot be not excluded that the personalization data are erroneously associated to a wrong product, e.g., to a wrong master profile. In addition, it is difficult to provide adequate solutions if the entity generating the personalization data, in particular the Profile Maker, desires a strict connection between personalization data and the master profile for which they have been generated.

SUMMARY

Embodiments of the invention can overcome one or more of the previously outlined drawbacks.

According to one or more embodiments provide a related system for the personalization of integrated circuit cards module as well as a corresponding related computer program product, loadable in the memory of at least one computer and including software code portions for performing the steps of the method when the product is run on a computer. As used herein, reference to such a computer program product is intended to be equivalent to reference to a computer-readable medium containing instructions for controlling a computer system to coordinate the performance of the method. Reference to "at least one computer" is evidently intended to highlight the possibility for the present disclosure to be implemented in a distributed/modular fashion.

Embodiments of the present invention provide solutions regarding a method for the generation of personalized profile package data in integrate circuit cards. In one example, the method includes providing a profile making entity with a table comprising a plurality of data records corresponding to a plurality of cards to be personalized. Each record comprises a plurality of personalization fields to store different types of personalization values. The profile making entity is provided with a file for the Profile Package comprising fields to be personalized corresponding to one or more of the fields to store different types of personalization values. Data records comprised in the table are combined with the file for the master Profile inserting personalization data in fields to be personalized to obtain respective personalized Profile Packages. The personalized Profile Packages are transmitted from a data preparation entity to the respective integrated circuit cards for storing. The file for the profile package performing an encryption with a master encryption key is protected by obtaining an encrypted file for the profile package. Data records in the plurality of data records are protected by performing an encryption with a respective data protection key thereby obtaining encrypted data records. The encrypted file for the profile package and encrypted data records is transmitted to the data preparation entity. The encrypted file for the profile package and encrypted data records are decrypted at the data preparation entity to obtain unencrypted data records and the file for the profile package. The combination of the unencrypted data records with the file for the master Profile to obtain respective personalized Profile Package is performed at the data preparation entity.

In variant embodiments, the respective data protection key is obtained on the basis of the encrypted file for the master Profile.

In variant embodiments, the respective data protection key is obtained on the basis of a hash of the encrypted file for the master Profile.

In variant embodiments, at the data preparatory the personalized Profile Packages are composed in a single output file or batch.

In variant embodiments, the file for the master Profile is converted in DER format at the profile making entity.

In variant embodiments, the master encryption key is associated to a product identifier identifying the file for the profile package.

The present disclosure provides also solutions regarding a system for the personalization of integrated circuit cards, in particular eUICC cards, including a profile making entity, a Mobile Network Operator and a Data Preparation entity, configured to generate personalized Profile Packages according to the method of any of the above described embodiments.

The present disclosure provides also solutions regarding a computer-program product that can be loaded into the memory of at least one processor and comprises portions of software code for implementing the method of any of the previous embodiments.

BRIEF DESCRIPTION OF THE DRAWINGS

Embodiments of the present disclosure will now be described with reference to the annexed drawings, which are provided purely by way of non-limiting example and in which:

FIGS. 1 to 3 have already been described in the foregoing; and

DETAILED DESCRIPTION OF ILLUSTRATIVE EMBODIMENTS

Figure 1:
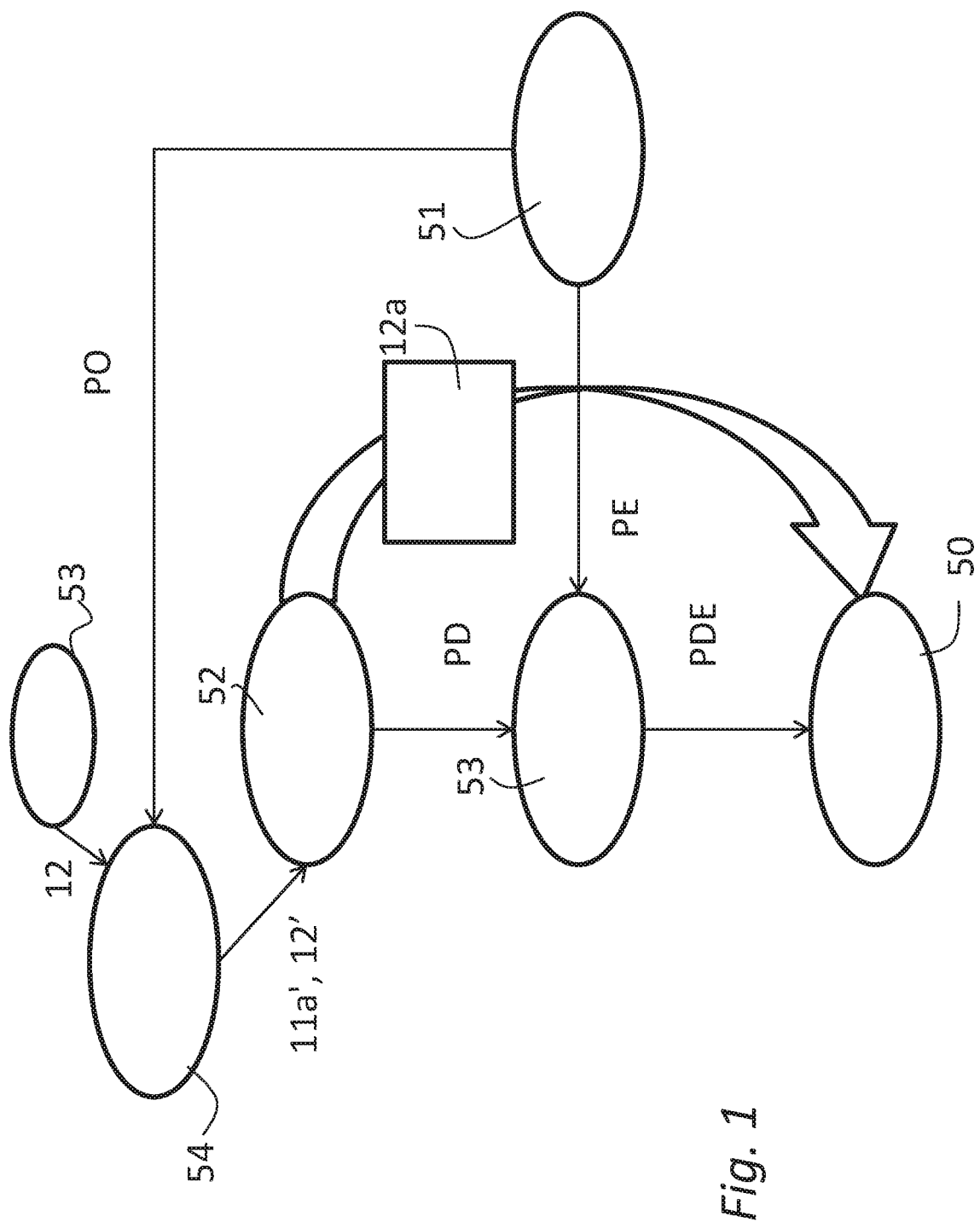

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figures parts, elements or components which have already been described with reference to FIGS. 1 to 4 are denoted by the same references previously used in such Figures; the description of such previously described elements will not be repeated in the following in order not to overburden the present detailed description.

The solution here, described substantially in comparison with the method for the generation of personalized profile package data in integrated circuit cards described with reference to FIG. 2, provides that the personalization data and master profile are not combined into an output file which is then sent to the Data Preparation for OTA transmission, but such files are sent separately to the data preparation entity, which then provides combination to produce the required batch of personalized profiles.

In this context, an integrated circuit card is not limited to an actual card. As an example, a SIM-card for mobile phones or IoT devices may be implemented by embedded SIM where the secured IC that may be found in a SIM-card is be directly soldered to the product board. The same soldered SIM circuits can be used in automotive for connectivity. Other secure products covering a number of applications where the IC stands is not necessarily in a card. Examples include identify documents such as passports, tags for products as printer cartridges and others. In other examples, a bank card, can for example, be replaced by a mobile phone, e.g., with no additional hardware. Any of these examples, along with others, could be considered an integrated circuit card for the purpose of this application.

The master profile is protected by means of a master key, which can be transmitted separately to the Data preparation and is identified by a product/profile identifier, known to the MNO.

The personalization data, formatted in a defined format, are protected by a key obtained on the basis of the master key, in particular by the hash of the master profile protected with the master key.

The protected master profile and protected personalization data are sent then to the data preparation which is configured to perform the combination and obtain the personalized packages to be sent to the cards through the secure router.

Figure 4:
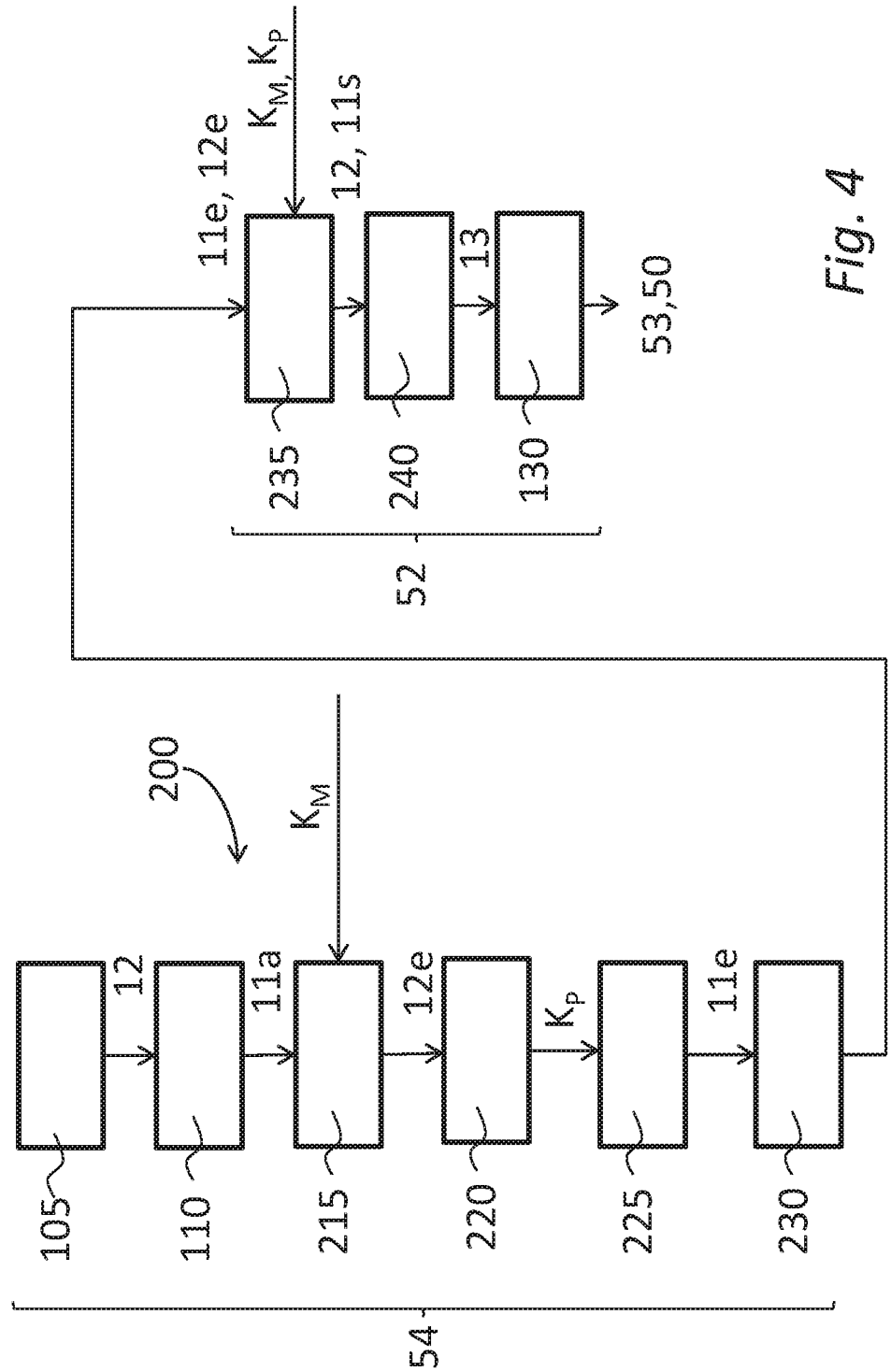
FIG. 4 shows a diagram flow illustrating an embodiment of the method here described.

In FIG. 4 is shown a diagram flow representing an embodiment 200 of the method of profile generation here described.

Initial operations 105 and no correspond to the operations already described with respect to FIG. 2 providing, at the Profile Maker 54, a master Profile Package file 12 and the table 11a. Of course these operations can be in any order or contemporary.

Then an operation 215 is performed in which the master Profile Package file 12 is protected by encrypting it with a master encryption key $K_M$. Such master encryption key $K_M$ can be shared separately, for instance from the MNO 51 and is identified by a respective product/profile identifier which is known to the MNO.

The operation 215 produces an encrypted master Profile Package file 12e.

Then in an operation 220 a data encryption key $K_P$ is obtained from the encrypted master Profile Package file 12e. In particular, the data encryption key $K_P$ is computed as the hash value of the encrypted master file 12e obtained by applying to it a hash function.

Also an operation 225 is performed, still at the Profile Maker 54, in which the personalization data in a set 11s of records selected from among the records $R_1 \ldots R_n$ in the personalization data table 11a are encrypted by the profile encryption key $K_P$, obtaining encrypted personalization data 11e.

As just discussed, such operation 225 is performed selecting the records which are to be transmitted, for instance in a given batch at the data preparation 52, from among the records $R_1 \ldots R_n$ in the personalization data table 11a. Thus, usually also the encrypted personalization data 11e, which encrypt the set 11s, have a size that can be lower than the size of the whole table 11a, encrypted or unencrypted.

Then in a step 230 the encrypted master file 12e and the encrypted personalization data 11e are sent, for instance via FTP protocol through wired or wireless communication channel to the Data Preparation 52.

It is underlined that the master encryption key $K_M$ may be shared between the MNO 51 and the Profile Maker 54 by a root key ceremony in which a pair of public and private key root keys are generated. At the data preparation entity 52 the protection keys $K_M$, $K_P$ are made available for instance by the MNO 51, for instance also by a key ceremony, so that in a step 235 the Data Preparation 52 can decrypt the encrypted master file 12e and the encrypted personalization data 11e, obtaining the master file 12 and the set of selected personalization data 11s, and combine them to obtain a set of corresponding personalized profiles 12a, in a way analogous to that described for operation 115 with respect to FIGS. 2 and 3. In a further step of operation 235, in the same way, personalized profiles 12a are composed in the output file 13, which in an operation 130 corresponding to the one already described for FIG. 1 is then sent to the UICC cards 50, for instance through the Secure Routing server 53.

The described solution allows thus a drastic reduction of the output file size. For instance, 100,000 subscriptions, i.e. 100,000 personalized profiles, are bundled in a 1 GB file approximately.

Furthermore, a first level product/compliance verification can be performed by decrypting even the first provision, e.g., the first personalized profile, instead of analyzing the entire output file corresponding to the batch.

Personalization data can be associated to a master profile, just knowing its hash value. This in case the master profile includes some sensitive data meant not to be unveiled to the personalization data generation entity.

Of course, without prejudice to the principle of the invention, the details of construction and the embodiments may vary widely with respect to what has been described and illustrated herein purely by way of example, without thereby departing from the scope of the present invention, as defined by the ensuing claims.

What is claimed is:

1. A method of generating personalized profile package data for integrated circuit cards, comprising:
    generating encrypted data records by encrypting a plurality of data records corresponding to a plurality of profile data with a respective data protection key, each data record comprising a plurality of personalization fields for storing different types of personalization values;
    generating an encrypted file for a profile package by encrypting a file for the profile package with a master encryption key, the file comprising fields to be personalized corresponding to one or more of the personalization fields;
    transmitting the encrypted file for the profile package and the encrypted data records to a data preparation circuit to be decrypted and combined to generate the personalized profile package data;
    decrypting, by the data preparation circuit, the encrypted data records and the encrypted file for the profile package to generate, respectively, decrypted data records and a decrypted file for the profile package;
    combining, by the data preparation circuit, the decrypted data records and the decrypted file for the profile package to generate the personalized profile package data; and
    transmitting the personalized profile package data from the data preparation circuit to respective integrated circuit cards.

2. The method of claim 1, wherein the respective data protection key is obtained based on the encrypted file for the profile package.

3. The method of claim 2, wherein the respective data protection key is obtained based on a hash of the encrypted file for the profile package.

4. The method of claim 1, wherein the generating the personalized profile package data comprises generating the personalized profile package data in a single output file or batch.

5. The method of claim 1, wherein the file for a master profile is converted in DER format at a profile making circuit.

6. The method of claim 1, wherein the master encryption key is associated with a product identifier identifying the file for a master profile.

7. The method of claim 1, wherein the integrated circuit cards are eUICC cards.

8. A method of generating personalized profile package data in integrated circuit cards, the method comprising:
- providing a table comprising a plurality of data records corresponding to a plurality of profile data, each data record comprising a plurality of personalization fields for storing different types of personalization values;
- providing a file for a profile package, the file comprising fields to be personalized corresponding to one or more of the personalization fields;
- protecting the file for the profile package by performing encryption with a master encryption key to generate an encrypted file for the profile package;
- protecting data records in the plurality of data records by performing encryption with a respective data protection key to generate encrypted data records;
- transmitting the encrypted file for the profile package and the encrypted data records to a data preparation circuit;
- decrypting the encrypted file for a master profile and the encrypted data records at the data preparation circuit to generate decrypted data records and a decrypted file for the master profile;
- combining the decrypted data records comprised in the table with the decrypted file for the master profile by inserting the personalization values in fields to be personalized to obtain respective personalized profile package data; and
- transmitting the personalized profile package data from the data preparation circuit to respective integrated circuit cards.

9. The method of claim 8, wherein the respective data protection key is obtained based on the encrypted file for the profile package.

10. The method of claim 9, wherein the respective data protection key is obtained based on a hash of the encrypted file for the profile package.

11. The method of claim 8, wherein the generating the personalized profile package data comprises generating the personalized profile package data in a single output file or batch.

12. The method of claim 8, wherein the file for the master profile is converted in DER format at a profile making circuit.

13. The method of claim 8, wherein the master encryption key is associated with a product identifier identifying the file for the master profile.

14. The method of claim 8, wherein the integrated circuit cards are eUICC cards.

15. A system for a personalization of integrated circuit cards configured to generate a personalized profile packages bundle, the system comprising:
- a data preparation circuit; and
- a profile making circuit configured to:
  - generate encrypted data records by encrypting a plurality of data records corresponding to a plurality of profile data with a respective data protection key, each data record comprising a plurality of personalization fields for storing different types of personalization values,
  - generate an encrypted file for a profile package by encrypting a file for the profile package with a master encryption key, the file comprising fields to be personalized corresponding to one or more of the personalization fields,
  - transmit the encrypted file for the profile package and the encrypted data records to the data preparation circuit
  - decrypt the encrypted data records and the encrypted file for the profile package to generate, respectively, decrypted data records and a decrypted file for the profile package,
  - combine the decrypted data records and the decrypted file for the profile package to generate the personalized profile packages bundle, and
  - transmit the personalized profile packages bundle to respective integrated circuit cards.

16. The system of claim 15, wherein the respective data protection key is obtained based on the encrypted file for the profile package or a hash of the encrypted file for the profile package.

17. The system of claim 15, wherein to generate the personalized profile packages, the profile making circuit generates a single output file or batch that includes the personalized profile packages bundle.

18. The system of claim 15, wherein the file for a master profile is converted in DER format at the profile making circuit.

19. The system of claim 15, wherein the master encryption key is associated with a product identifier identifying the file for a master profile.

20. The system of claim 15, wherein the integrated circuit cards are eUICC cards.

* * * * *